United States Patent
Goldberg

(10) Patent No.: US 10,185,759 B2
(45) Date of Patent: Jan. 22, 2019

(54) DISTINGUISHING EVENT TYPE

(71) Applicant: Dropbox, Inc., San Francisco, CA (US)

(72) Inventor: Isaac Goldberg, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 384 days.

(21) Appl. No.: 14/869,695

(22) Filed: Sep. 29, 2015

(65) Prior Publication Data

US 2017/0091300 A1    Mar. 30, 2017

(51) Int. Cl.
  *G06F 7/00* (2006.01)
  *G06F 17/00* (2006.01)
  *G06F 17/30* (2006.01)

(52) U.S. Cl.
  CPC .. *G06F 17/30581* (2013.01); *G06F 17/30368* (2013.01)

(58) Field of Classification Search
  CPC ......... G06F 17/30581; G06F 17/30368; G06F 17/30575

USPC ....................... 707/618, 624, 625
See application file for complete search history.

(56) References Cited

U.S. PATENT DOCUMENTS

| | | | | |
|---|---|---|---|---|
| 9,773,051 | B2 * | 9/2017 | Smith | G06F 17/30575 |
| 2007/0271317 | A1 * | 11/2007 | Carmel | G06F 17/30575 |
| 2016/0094649 | A1 * | 3/2016 | Dornquast | G06F 17/30174 709/227 |

* cited by examiner

*Primary Examiner* — Md I Uddin
(74) *Attorney, Agent, or Firm* — Polsinelli PC

(57) ABSTRACT

An example computer-implemented method to determine if an event was triggered by an action performed by a client synchronization module begins with receiving an event from an operating system. The event can be associated with a content item. The computer can then compare the event to a log. The log can describe one or more recent actions performed by a client synchronization module. The computer can then determine whether the event was triggered by a recent action in the log. When the event is triggered by a recent action in the log, the computer can ignore the event. When the event is not triggered by a recent action in the log, the computer can process the event.

14 Claims, 6 Drawing Sheets

FIG. 3A

Indicator 300

| Index | Name | Drive | Path | Time | Action Type | Action Values |
|---|---|---|---|---|---|---|
| 1 | file.txt | c:\ | users\docume | 9/1/2015 16:32 | Rename | file_old.txt |
| 2 | my_video | d:\ | videos\ | 9/1/2015 - 4:33:00 P | Delete | - |
| 3 | birthday.jpg | \\JOHN\ | birthday\ | 9/1/2015 - 4:29 PM | Share With | John Sr |
| 4 | Folder: Friends | e:\ | share\ | Unix: 1441150562 | Remove Share | *all |
| 5 | document.txt | c:\ | secret\ | - | Replace | document.txt |

Description 380

| Index | Time | Modified Time | Size | Name | Hash |
|---|---|---|---|---|---|
| 1 | - | - | - | - | - |
| 2 | 9/1/2015 - 4:34:00 PM | - | - | - | - |
| 3 | 9/1/2015 - 4:29 PM | 9/1/2015 - 4:29 PM | 2021402 Bytes | birthday.jpg | 3169S3507DEC0FC69E61348A7C91F37976C80CBE |
| 4 | Unix: 1441150762 | Unix: 1441150762 | - | Folder: Friends | - |
| 5 | - | 9/1/2015 - 4:39 PM | 24009842 Bytes | document.txt | 64CF0EB461F5B8C3F1B1870D4E9064342CF5228A |

340    342    344    346    348    350

316a, 316b, 316c, 316d, 316e

DISTINGUISHING EVENT TYPE

BACKGROUND

In many content synchronization approaches, when an operating system detects that an action has occurred to a content item, the operating system produces an event associated with the content item. The operating system then sends the event to a client synchronization module. The client synchronization module then processes the event and the content item to determine if there are changes that should be synchronized with a content management system. This processing step can be computationally expensive and might require large amounts of data to be sent over a network. This step can be unnecessary if the client synchronization module triggered the event. What is needed is an approach that more intelligently processes events and content items.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for determining if an event was triggered by an action performed by a client synchronization module.

An example computer-implemented method to determine if an event was triggered by an action performed by a client synchronization module begins with receiving an event from an operating system. The event can be associated with a content item. The computer can then compare the event to a log. The log can describe one or more recent actions performed by a client synchronization module. The computer can then determine whether the event was triggered by a recent action in the log. When the event is triggered by a recent action in the log, the computer can ignore the event. When the event is not triggered by a recent action in the log, the computer can process the event.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIGS. 3A and 3B depict example indicators and first descriptions respectively;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for detecting whether an operating system event was triggered by an action performed by a client synchronization module. A client synchronization module might use an operating system to help identify content items that have changed; the client synchronization module might listen for an operating system event to indicate that a content item has changed. Certain operations performed by the client synchronization module might trigger an operating system event. It can be undesirable and unnecessary to process these events. The client synchronization module can run more efficiently by ignoring these events that it triggers. In some embodiments, the client synchronization module maintains a record of operations it performs and, when it detects an operating system event, the client synchronization module can determine whether the event was triggered by the client synchronization module. If it triggered the event, it can ignore the event.

Figure 1A:
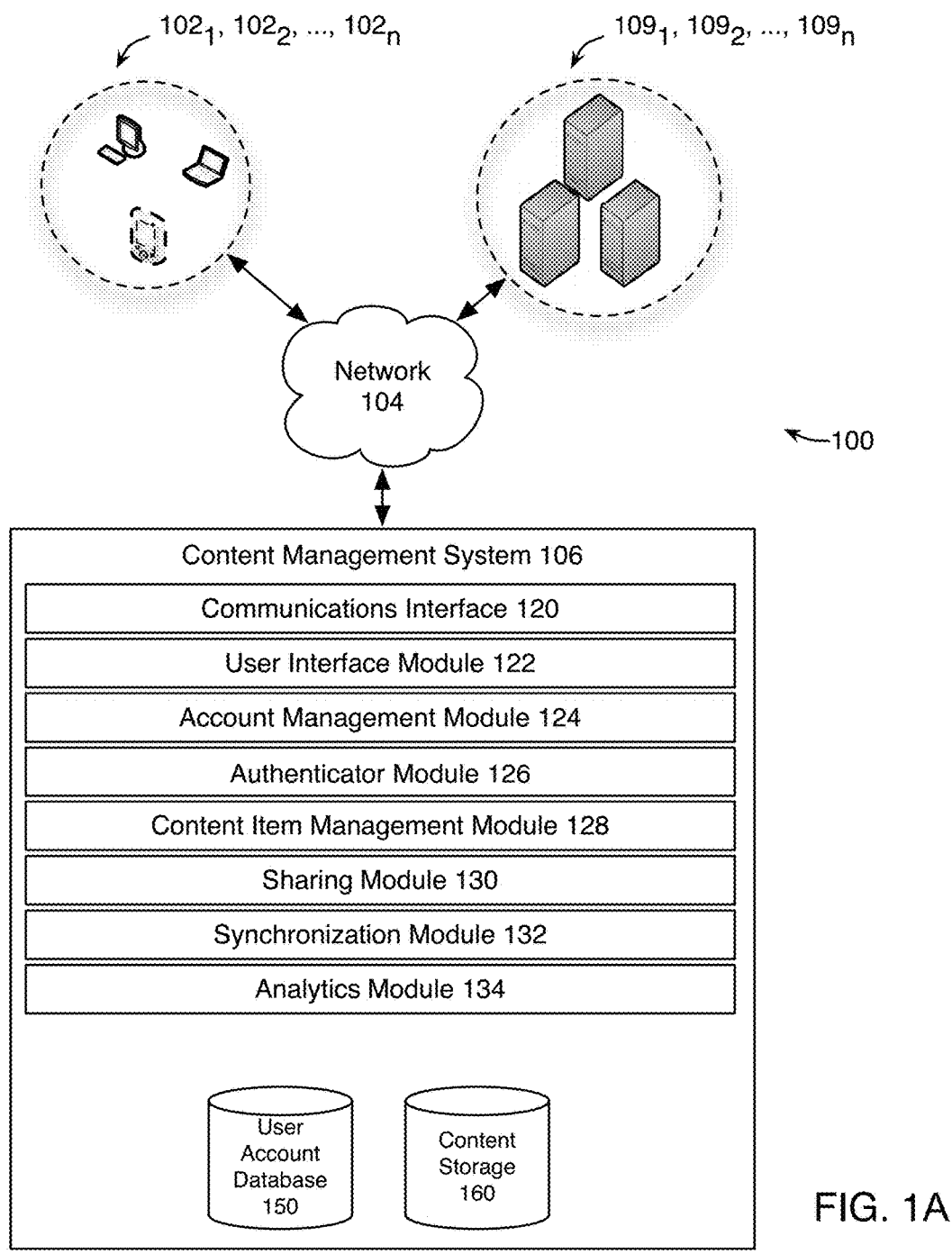
FIGS. 1A and 1B show example configurations of devices and a network in accordance with some embodiments.

With respect to implementing various embodiments of the disclosed technology, an example system configuration 100 is shown in FIG. 1A, wherein electronic devices communicate via a network for purposes of exchanging content and other data. The system can be configured for use on a wide area network such as that illustrated in FIG. 1A. However, the present principles are applicable to a wide variety of network configurations that facilitate the intercommunication of electronic devices. For example, each of the components of system 100 in FIG. 1A can be implemented in a localized or distributed fashion in a network.

In system 100, a user can interact with content management system 106 (e.g., an online synchronized content management system) through client devices $102_1$, $102_2$, ..., $102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

Figure 1B:
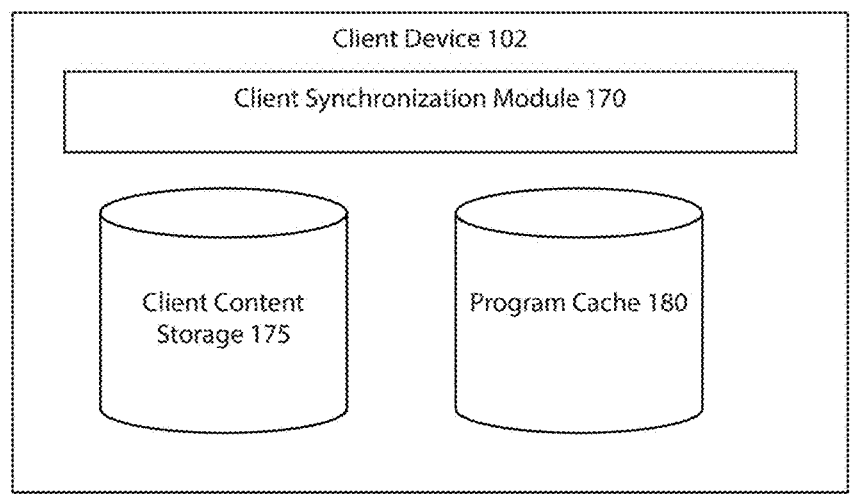

While content management system 106 is presented with specific components, it should be understood by one skilled in the art, that the architectural configuration of system 106 is simply one possible configuration and that other configurations with more or fewer components are possible. For example, FIG. 1B, which is described in view of FIG. 1A, shows one example embodiment of client device 102 including client synchronization module 170, client content storage 175, and program cache 180. Client synchronization module 170 can be a process, application, or instructions executed by client device 102. Client content storage 175 can store content items as well as other items (e.g., programs). In some embodiments, client synchronization module 170 utilizes program cache 180 to store data and items; in some embodiments, program cache 180 is primarily only accessed by client synchronization module 170. Program cache 180 can be located within client device 102 storage such that if content synchronization 170 crashes, program cache 180 can remain.

Figure 2:
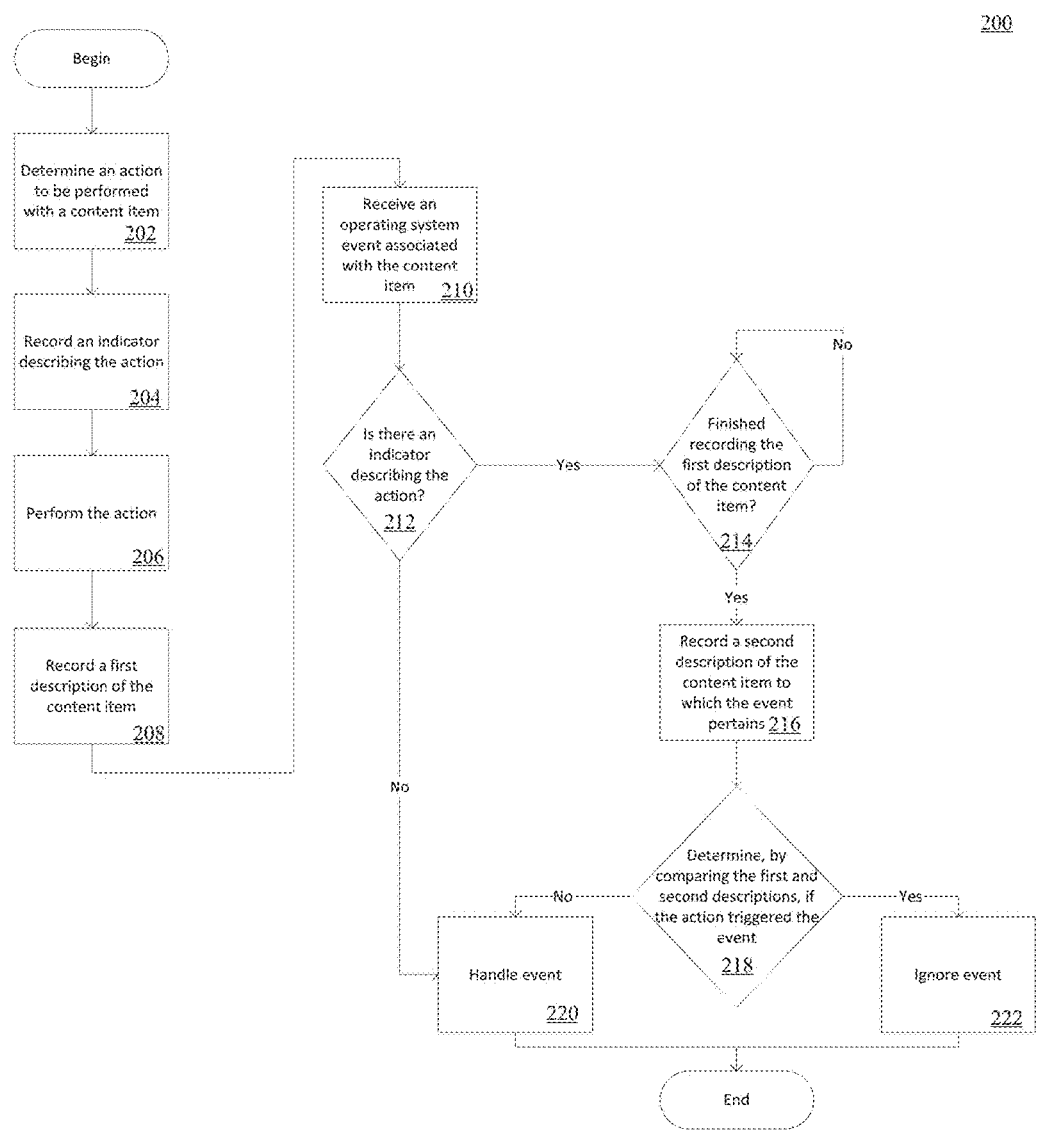
FIG. 2 shows an example flowchart according to various embodiments.

FIG. 2 depicts an example method 200 running on client device 102 according to various embodiments. In some embodiments, a program for synchronizing content items ("client synchronization module 170") can perform example method 200 while running on client device 102. Client synchronization module 170 can connect with content management system 106. Client device 102 can also run an operating system that provides an environment for running programs (e.g., client synchronization module 170) and organizing items (e.g., content items and collections of content items). The principles shown in example method 200 can be applied to embodiments pertaining to the synchronization of content items as well as embodiments pertaining to other functions (e.g., creation of content items, distribution of content items, etc.).

At step 202, client synchronization module 170 can determine an action to be performed with an item (e.g., a content item or collection of content items). This action can be creating the item, editing the item, renaming the item, deleting the item, modifying the item's attributes, etc. In some embodiments, content management system 106 initiates step 202. For example, the item might be created, modified, etc. on content management system 106 or may be received by content management system 106 from another client device; content management system 106 can then instruct client synchronization module 170 to replicate the creation, modification, etc. on client device 102. In some embodiments, client synchronization module 170 can initiate step 202 on its own. For example, a user might perform an action (e.g., delete a file) through an interface on client device 102. In some embodiments, the item does not yet exist on client device 102 (e.g., if the action is to create the item). In some embodiments, the action is not related to an item, for example the action can be activating or deactivating modules on client device (e.g., turning on or off a wireless signal), sending a data stream over a network (e.g., a video feed), performing a computation (e.g., mining for Bitcoin), or any other action that might be detected by another program or operating system.

At step 204, client synchronization module 170 can store an indicator describing the action. The description can include the class of action (e.g., rename, move, delete, edit, change permissions, modify metadata, etc.) as well as specifics of the action and the associated item. The indicator can include a current time and/or a time that the action will likely occur. If the action is associated with a content item, the indicator can also describe the content item (including, for example, a filename, file size, date modified, creation date, path to the content item, user privileges associated with the content item, users that the content item is shared with, time of last synchronization, description of the last synchronization state of the content item, hash of part or all of the content item, other metadata, etc.). In some embodiments, the indicator can also describe a future state of the content item. For example, if the action is to rename the item, the indicator can include the current name and the future name of the item. In some embodiments, this description can include data that is efficient to collect (e.g., a filename, file size, and/or modified time) while omitting data that is resource-intensive to collect (e.g., a hash of the item). Similarly, the indicator can describe the future size, modified time, path, etc. of the item.

In step 206, client synchronization module 170 can perform the action. In some embodiments, client synchronization module 170 instructs another program to perform the action such as an operating system. In some embodiments, client synchronization module 170 does not perform or instruct another program to perform the action; rather client synchronization module 170 determines that another program will likely perform the action.

In step 208, client synchronization module 170 can store a first description of the item in a log. In some embodiments, a log describes one or more recent actions; this description of one or more recent actions can include a description of associated content items. Either the description of one or more recent actions or the description of associated content items can be a "first description". The first description can include a filename, file size, date modified, creation date, path to the item, user privileges associated with the item, users that the item is shared with, time of last synchronization, description of the last synchronization state of the item, hash of part or all of the item, other metadata, etc. In some embodiments, this description can include data that is efficient to collect (e.g., a filename, file size, path, and/or modified time) while omitting data that is resource-intensive to collect (e.g., a hash of the item). The first description can include a current time. In some embodiments, step 208 includes modifying the indicator from step 204 to become the first description (e.g., changing the indicator to represent the resultant characteristics of the content item). In some embodiments, step 208 includes storing information about the recent action in a log. The log can thus describe the recent action as well as other past and futures actions that are performed by client synchronization module 170.

In step 210, client synchronization module 170 can receive an operating system event associated with the item. This event may inform client synchronization module 170 that an action (e.g., a recent action) has occurred to the item (e.g., modified, created, deleted, etc.). In some embodiments, the event is associated with a content item (e.g., the item). The event can include a description of the recent action with varying degrees of specificity. In some embodiments, the operating system has a queue of triggered events. The event might not be immediately made available to programs for processing. The event can include a time the event was trigged (i.e., the time the action was completed), a time the recent action was commenced, a time that the recent action was completed, and/or a time that the recent action is made available to programs for processing.

In step 212, client synchronization module 170 can detect the indicator describing the action. This can inform client synchronization module 170 that an action was recently performed by client synchronization module 170. In some embodiments, various steps (e.g., steps 210-222) can occur in a separate process thread (i.e., an event handling routine) than other steps in example method 200 (e.g., steps 202-208). Because they can be in separate threads, it is possible that client synchronization module 170 might receive the event (step 210) before client synchronization module 170 can complete step 208. In such cases, the indicator from step 204 can help client synchronization module 170 determine whether the event might have been triggered by the action in step 206. For example, if an indicator exists, then the synchronization performed the action in 206 and the action might have triggered the event; the flowchart then progresses to step 214. If the indicator does not exist, then client synchronization module 170 did not perform the action in 206 and thus did not trigger the event from 210. The synchronization can then handle the event (step 220).

In some embodiments, step 212 includes comparing the indicator to the event. For example, comparing the filename, path, size, modified time, etc. of the indicator and event.

In step 214, client synchronization module 170 can determine if it has finished recording the first description of the content item (e.g., step 208). Step 214 can loop (i.e., hold or wait) until client synchronization module 170 finishes storing the description of the content item. When it does finish storing the first description of the content item, client synchronization module 170 can proceed to step 216.

In step 216, the client synchronization module 170 can detect a second description of the item to which the event pertains 216. The second description can include a filename, file size, date modified, creation date, path to the item, user privileges associated with the item, users that the item is shared with, time of last synchronization, description of the last synchronization state of the item, hash of part or all of the item, other metadata, etc. In some embodiments, the second description can include data that is efficient to collect (e.g., a filename, file size, path, and/or modified time) while omitting data that is resource-intensive to collect (e.g., a hash of the item). This description can include a current time. In some embodiments, client synchronization module 170 completes step 208 long before steps 210-216. In some such embodiments, the event might have been triggered by intervening non-client synchronization module action (e.g., user action). Further, there might be an intervening action that occurs after receiving the event in step 210.

In step 218, client synchronization module 170 can determine if the action (from step 206) triggered the event received in step 210. The local client can do this by comparing the first description (from step 208) and the second description (from step 216), yielding a comparison. In some embodiments, step 218 can include comparing the event to the log and determining whether the event was triggered by a recent action in the log. For example, client synchronization module 170 can gather information (e.g., a second description) about the event and the content item associated with the event and compare this information with a description of a recent action and associated content item contained in the log (e.g., a first description). A positive outcome ("Yes") of this comparison can result from a complete match (e.g., the elements in the first description and the elements in the second description match exactly) or a partial match (e.g., the filenames match and the sizes match, but the modified times do not match). A negative outcome ("No") of the comparison can result from a partial match (e.g., some elements are different) or a complete mismatch (all elements are different).

The comparison in step 218 can be of metadata between the two descriptions. For example, client synchronization module 170 can compare at least one of a filename, a file size, a date modified, a creation date, or a path of the associated content items. In some embodiments, client synchronization module 170 merely compares the description contained in the log with the metadata of the content item described in the event.

A positive outcome in step 218 can result in client synchronization module 170 ignoring the event in step 222. In some embodiments, ignoring the event means exiting an event handling routine without taking action.

A negative outcome in step 218 or step 212 can result in client synchronization module 170 handling (e.g., "processing") the event in step 220. Because arriving at step 220 implies that client synchronization module 170 did not trigger the event, the event likely is related to a content item change that should be synchronized with content management system 106. In some embodiments, step 220 includes creating a third description of the content item. This third description can include elements that (in some embodiments) were not included in the second description. For example, the third description can include the more expensive elements such as a hash of the content item. Client synchronization module 170 can then compare the third description with a previous description stored in program cache 180; the previous description can store a hash of the content item when it was last synchronized with content management system 106. If client synchronization module 170 determines that a change has occurred to the content item, it can commit (i.e., synchronize) the content item to content management system 106 as part of a synchronization procedure.

In some embodiments, the action depicted in example method 200 can be performed with multiple items. For example, the action might be to delete, create, or modify a collection of content items. In some such embodiments, the indicator can describe the single action (e.g., describe the collection that will be deleted), or multiple sub actions (e.g., describe each content item in a collection that will be deleted). In some embodiments, the action can be a collection of actions (e.g., a batch process) or a single action.

FIGS. 3A and 3B depict entries in logs for storing indicators and first descriptions respectively. In some embodiments, log 300 and log 380 are maintained in the same data structure. This would result in indicators and first descriptions being stored in the same location. Alternatively, the two logs can be maintained in separate data structures. Although, log 300 and log 380 depict indicators and first descriptions in a tabular form, any other alternative structures are effective (e.g., linked list, stack, queue, database, text file, independent files, etc.). It should be understood that additional or fewer columns 321-350 can be used in accordance with some embodiments. For example, column 321 and column 340 ("Index") can be omitted. Further, log 300 and log 380 can represent multiple indicators $306_a$-$306_e$ and first descriptions $316_a$-$316_e$. In some embodiments, indicators and/or descriptions are stored in program cache 180.

In FIG. 3A, log 300 contains various indicators $306_a$-$306_e$ (collectively, indicator 306). Indicator 306 can be the indicator that describes the action that is stored in step 204 in FIG. 2. Each indicator 306 can have indicator data and the indicator data can include index 321, name 322, drive 324, path 326, time 328, action type 330, action values 332, etc., or any combination of the foregoing. Indicator 306 can have fewer elements (e.g., omitting index 321) or more elements. Each indicator 306 can be associated with at least one item and at least one action. In some embodiments, the item is a content item; alternatively, the item can be a collection (e.g., a shareable collection). Index 321 can be a random number, a sequential number, a string derived from the associated item, etc. Name 322 can be a name of the item (e.g., a filename or folder name) or a descriptive label or title associated with the item. Drive 324 can be the root location of the item, such as a physical drive (e.g., disk, memory card, SSD), a user account (e.g., "JOHN" as in indicator 310), a domain, a computer, a network location, etc. If appropriate, path 326 can be a file path to the indicator's respective content item. In some embodiments, path 326 represents an identifier to a collection that contains the indicator's respective item. For example, with indicator $306_a$, path 326 is "share\" which might be a shared collection. In some embodiments, path 326 represents tags or labels that identify the collection that contains the item. In some embodiments, there is no path associated with the item.

Time 328 can represent the time that indicator 306 is stored. For example, indicator $306_a$ was stored at 9/1/2015 at 16:32. Time 328 can be stored in a variety of formats. In some embodiments, time 328 represents the scheduled or expected time that the action associated with indicator 306 will start or finish. In some embodiments, time 328 is not stored, instead the relative position of indicator 306 in log 300 can provide some insight as to the time indicator 306 was created. Action type 330 can be the type of action corresponding to the action associated with indicator 306 (e.g., rename, delete, share with, remove share, replace, edit, update, change permissions, etc.). Action values 332 can contain extra data that helps describe the action. For example, with indicator $306_a$, action type 330 is "Rename" and action values 332 is "file_old.txt". This can mean that name 322 ("file.txt") will be renamed to "file_old.txt" when the action completes.

FIG. 3B depicts log 380 containing first descriptions $316_a$-$316_e$ (collectively, first description 316). First description 316 can be the description stored at step 208 in FIG. 2 describing the action just completed and can be associated with an item (e.g., a content item or collection of content items). First description 316 can contain index 340, time 342, modified time 344, size 346, name 348, and hash 350. As mentioned above, each first description 316 can be a continuation of a corresponding indicator 306 (e.g., indicator $306_a$ and first description $316_a$ being in the same entry in a log). In some embodiments, first description 316 also includes elements that are stored in indicator 306, such as drive 324, path 326, action type 330, action values 332, etc. In some such embodiments, when first description 316 is stored, it partially or completely replaces its corresponding indicator 306. For example, time 328 can be updated to time 344 and action values 332 can be removed. Similar to index 321, index 340 can be a random number, sequential number, string from the associated item, etc. In some embodiments, first description 316 is matched to indicator 306 using their corresponding indices 321 and 340. For example, indicator $306_b$ can correspond to first description $316_b$ as they both have an index of "2".

Time 342 can be the time that the corresponding first description was stored into log 380. In some embodiments, time 342 is the time that the associated action was completed. Modified time 344 can be the modified time of an item (e.g., a content item or collection) as reported by a host operating system. Size 346 can be the size of the item as reported by a host operating system. Name 348 can be the name of the item as reported by a host operating system. In some embodiments, a hash is calculated of the item and stored in hash 350. In some embodiments, the hash is not calculated because the computation is resource intensive, e.g., in time, processing, etc., and hash 350 is not included.

In some embodiments, indicator 306 and first description 316 are stored in temporary memory (e.g., RAM). In some embodiments, each indicator 306 has an expiration time where it will automatically be deleted. Similarly, first description 316 can have an expiration where it will automatically be deleted. Such an expiration time can help ensure that log 300 or 380 only contain indicators and first descriptions that might match with events. In some embodiments, log 300 or log 380 have a fixed size so that when a new entry (e.g., indicator 306 or first description 316) is added, the oldest entry will be discarded.

In some embodiments, when an indicator is stored, a placeholder first description is also stored. For example, first description $316_a$ and $316_b$ can be placeholder first descriptions that will be filled out upon completion of the associated action.

The second description is not depicted, but can contain elements such as those in log 300 and log 380. For example, second description can contain index 321, name 322, drive 324, path 326, time 328, action type 330, action values, 332, modified time 344, size 346, name 348, hash 350, or any combination of the foregoing.

In some embodiments, indicator 306 contains predictions of values that might appear as first description 316. For example, indicator $306_e$ might have contain an estimate of size 346.

Figure 4:
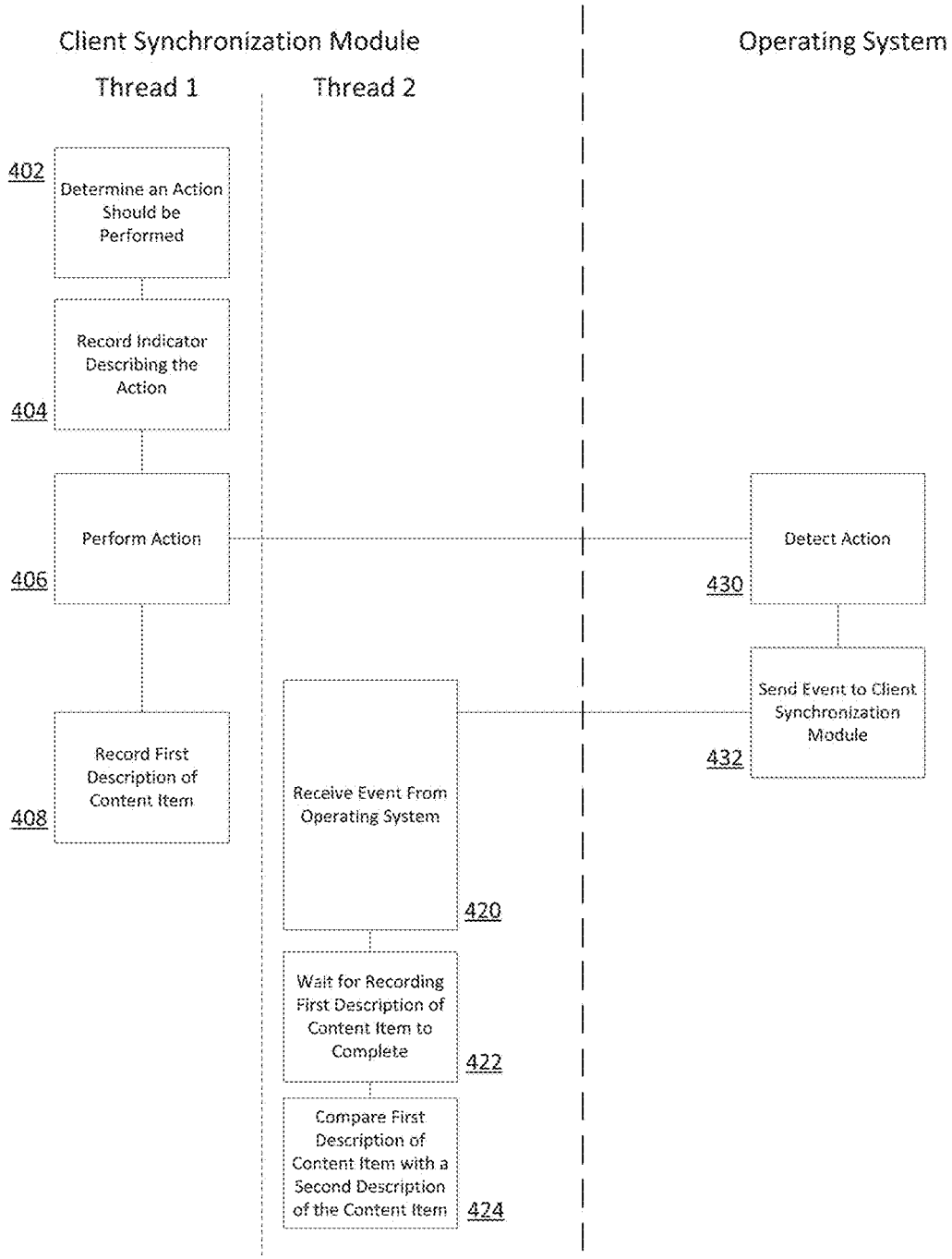
FIG. 4 depicts an example timeline according to various embodiments.

FIG. 4 depicts timeline 400 of steps in local client and operating system. Some steps in FIG. 4 correspond to steps in FIG. 2. For example step 402 corresponds to step 202, step 404 corresponds to step 204, step 406 corresponds to step 206, step 408 corresponds to step 208, step 420 corresponds to step 210, step 422 corresponds to step 214, and step 424 corresponds to steps 216 and 218. After step 406, or simultaneously with step 406, the operating system detects the action in step 430. In some embodiments, the action is step 406 is to send an instruction to the operating system; in some such embodiments, detect action of step 430 includes executing the instruction. After step 430, the operating system can send the event to client synchronization module 170 in step 432. In some embodiments, client synchronization module 170 has pre-registered with the operating system, requesting that the operating system sends certain events (e.g., events pertaining to content items) to client synchronization module 170.

In FIG. 4, steps 402, 404, 406, and 408 can be associated with thread 1 while steps 420, 422, and 424 can be associated with thread 2. Thread 1 and thread 2 can be different processes or threads asynchronously running on a processor. Because of their asynchronous nature, in some embodiments, step 420 can occur before, during, or after step 408. In other words, the operating system might send the event (step 432) before client synchronization module 170 stores the first description of the content item (step 408). To accommodate this, in step 422 client synchronization module 170 waits if or until the storing of the first description of the content item completes. In some embodiments, steps 402-424 are performed within the same processing thread.

Figure 5A:
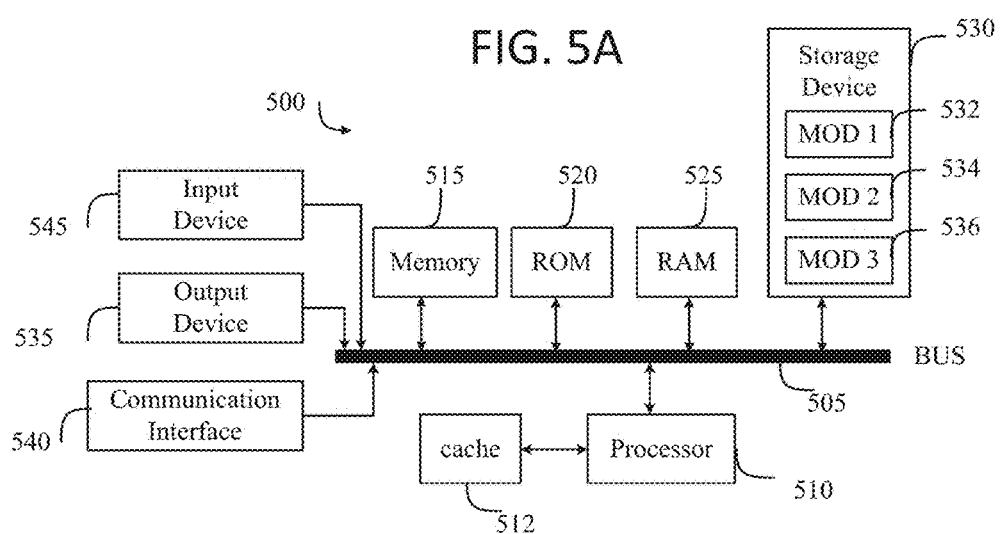
FIG. 5A shows an example possible system embodiment for implementing various embodiments of the present technology.
Figure 5B:
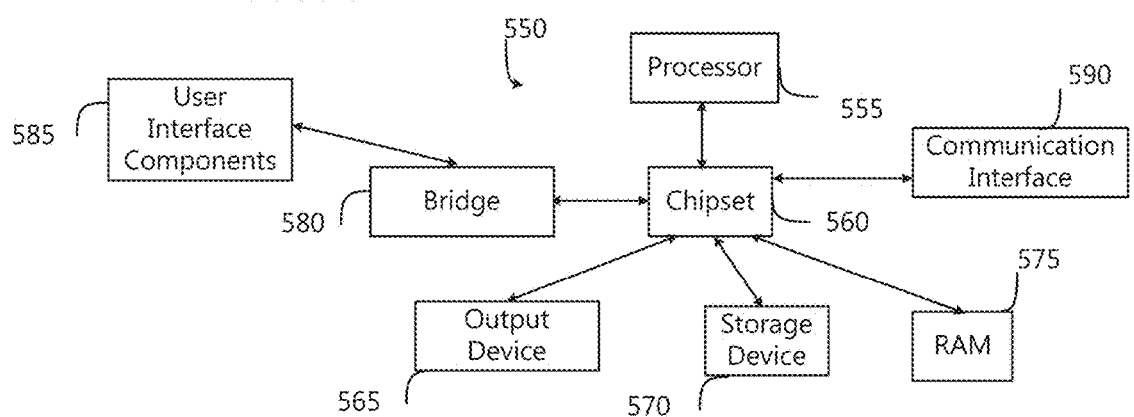
FIG. 5B shows an example possible system embodiment for implementing various embodiments of the present technology.

5A and FIG. 5B show example possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Example system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   storing an indicator describing an action that will be performed;
   recording, by a client synchronization service on a client device, a log of events identifying events generated by the client synchronization service on the client device, the client synchronization service being associated with a content management system;
   receiving, by the client synchronization service on the client device, an event notification generated by an operating system on the client device, the event notification identifying an event for a content item managed by the client synchronization service;
   after receiving the event notification, determining, based on the indicator, the log of events has not yet stored a description of the action that was to be performed;
   waiting until the log of events has stored the description of the action that was to be performed before determining whether a recent action triggered the event notification;
   determining whether the event notification received from the operating system was triggered by an action in the log of events of the client synchronization service based on the recent action in the log of events describing metadata of the content item, the metadata including at least one of a filename, a file size, a date modified, a creation date, or a path of the content item; and
   processing the event identified by the event notification via the client synchronization service on the client device only when the client synchronization service determines that the event identified by the event notification from the operating system was not triggered by an action in the log of events of the client synchronization service on the client device.

2. The computer-implemented method of claim 1, wherein the determining whether the event notification received from the operating system was triggered by an action in the log of events of the client synchronization service further comprises:
   determining whether at least one difference in time between an event time and a time associated with the recent action in the log of events is below a predetermined amount.

3. The computer-implemented method of claim 1, further comprising removing the indicator after storing the description of the action is stored in the log of events.

4. The computer-implemented method of claim 1 wherein the event notification describes at least one of: storing the content item, editing the content item, moving the content item, or deleting the content item.

5. The computer-implemented method of claim 1, wherein the client synchronization service is configured to synchronize content items between the client device and the content management system.

6. A non-transitory computer-readable medium storing computer executable instructions which, when executed by one or more processors, cause a computer device to:
   store an indicator describing an action that will be performed;
   record, by a client synchronization service on the computer device, a log of events identifying events generated by the client synchronization service on the computer device, the client synchronization service being associated with a content management system;
   receive an event notification generated by an operating system on the computer device, the event identifying an event for a content item managed by the client synchronization service;
   after receiving the event notification, determine, based on the indicator, that a description of the action is not stored on the log of events;
   wait until the log has stored the description of the action before determining whether a recent action triggered the event notification;
   determine whether the event notification received from the operating system was triggered by an action in the log of events of the client synchronization service based on the recent action in the log of events describing metadata of the content item, the metadata including at least one of a filename, a file size, a date modified, a creation date, or a path of the content item; and
   process the event identified by the event notification via the client synchronization service on the computing device only when the client synchronization service determines that the event identified by the event notification from the operating system was not triggered by an action in the log of events of the client synchronization service on the computing device.

7. The non-transitory computer-readable medium of claim 6, wherein determine whether the event notification received from the operating system was triggered by an action in the log of events of the client synchronization service comprises:
   determine whether at least one difference in time between an event time and a time associated with the recent action in the log of events is below a predetermined amount.

8. The non-transitory computer-readable medium of claim 6, storing computer executable instructions which, when executed by the one or more processors, cause the computing device to remove the indicator.

9. The non-transitory computer-readable medium of claim 6 wherein the event notification describes at least one of: storing the content item, editing the content item, moving the content item, or deleting the content item.

10. The non-transitory computer-readable medium of claim 6, wherein the client synchronization service is configured to synchronize content items with the content management system.

11. A system comprising:
one or more processors;
at least one non-transitory computer-readable medium; and
computer readable instructions stored on the non-transitory computer-readable medium, that when executed by the one or more processors cause the system to:
store an indicator describing an action to be performed;
record, by a client synchronization service on the system, a log of events identifying events generated by the client synchronization service on a computer device, the client synchronization service being associated with a content management system;
receive an event notification generated by an operating system on the system, the event notification identifying an event for a content item managed by the client synchronization service;
after receiving the event notification, determine, based on the indicator, that a description of the action is not stored in the log of events;
wait until the log has stored the description of the action to be performed before determining whether a recent action triggered the event notification;
determine whether the event notification received from the operating system was triggered by an action in the log of events of the client synchronization service based on a recent action in the log of events describing metadata of the content item, the metadata including at least one of a filename, a file size, a date modified, a creation date, or a path of the content item; and
ignore, by the client synchronization service, the event identified by the event notification when the client synchronization service determines that the event identified by the event notification from the operating system was triggered by the client synchronization service on the system.

12. The system of claim 11, wherein determine whether the event notification received from the operating system was triggered by an action in the log of events of the client synchronization service comprises determine whether a difference in time between an event time and a time associated with the recent action is below a predetermined amount.

13. The system of claim 11, wherein the event notification describes at least one of: storing the content item, editing the content item, moving the content item, or deleting the content item.

14. The system of claim 11, wherein the client synchronization service is configured to synchronize content items on the system with the content management system.

* * * * *